(12) United States Patent
Chiodini

(10) Patent No.: US 10,048,351 B2
(45) Date of Patent: Aug. 14, 2018

(54) METHOD FOR COMMUNICATION IN AN AD HOC NETWORK

(71) Applicant: SAFRAN ELECTRONICS & DEFENSE SAS, Boulogne Billancourt (FR)

(72) Inventor: Alain Chiodini, Boulogne Billancourt (FR)

(73) Assignee: SAFRAN ELECTRONICS & DEFENSE SAS, Boulogne Billancourt (FR)

( * ) Notice: Subject to any disclaimer, the term of this patent is extended or adjusted under 35 U.S.C. 154(b) by 0 days.

(21) Appl. No.: 15/564,915

(22) PCT Filed: Apr. 6, 2016

(86) PCT No.: PCT/EP2016/057516
§ 371 (c)(1),
(2) Date: Oct. 6, 2017

(87) PCT Pub. No.: WO2016/162376
PCT Pub. Date: Oct. 13, 2016

(65) Prior Publication Data
US 2018/0095158 A1    Apr. 5, 2018

(30) Foreign Application Priority Data
Apr. 10, 2015   (FR) ...................... 15 53089

(51) Int. Cl.
*H04W 24/00* (2009.01)
*G01S 5/02* (2010.01)
(Continued)

(52) U.S. Cl.
CPC .......... *G01S 5/0289* (2013.01); *H04B 1/7163* (2013.01); *H04W 64/003* (2013.01);
(Continued)

(58) Field of Classification Search
CPC ..... H04W 64/00; H04W 8/245; H04W 84/12; H04W 76/023; H04W 64/003;
(Continued)

(56) References Cited

U.S. PATENT DOCUMENTS

2004/0192353 A1   9/2004  Mason et al.
2005/0215169 A1*  9/2005  Bamesberger ......... A63H 33/00
                                                         446/73
(Continued)

FOREIGN PATENT DOCUMENTS

WO      01/22672 A1     3/2001
WO   2014/088848 A1     6/2014

OTHER PUBLICATIONS

Jun. 17, 2016 Search Report issued in International Patent Application No. PCT/EP2016/057516.

*Primary Examiner* — Danh Le
(74) *Attorney, Agent, or Firm* — Oliff PLC; R. Brian Drozd

(57) ABSTRACT

A communication method in an ad hoc network, including a coordinating mobile communication device, referred to as the coordinator device, and a plurality of subordinate mobile communication devices, referred to as subordinate devices, each communication device including a wireless communication module and a positioning module using a transmission of first pulses modulated in accordance with a first ultra-wide band modulation in order to determine information representing a position of said communication device. The method includes, when it is implemented by a communication device: obtaining data to be transmitted; checking a transmission capability of the wireless communication module; when the wireless communication module does not allow to transmit the data, using the positioning module to transmit said data in the form of second pulses orthogonal to the first pulses.

9 Claims, 4 Drawing Sheets

(51) Int. Cl.
*H04B 1/7163* (2011.01)
*H04W 76/02* (2009.01)
*H04W 64/00* (2009.01)
*H04W 76/14* (2018.01)
*H04W 84/18* (2009.01)

(52) U.S. Cl.
CPC ......... *H04W 76/023* (2013.01); *H04W 76/14* (2018.02); *H04W 84/18* (2013.01)

(58) Field of Classification Search
CPC ... H04W 84/18; H04W 4/01; H04M 1/72519; G07F 17/30011; G01S 5/0289; H04B 1/7163
USPC .................. 455/456.1, 550.1, 418; 707/752; 370/338

See application file for complete search history.

(56) References Cited

U.S. PATENT DOCUMENTS

| | | | |
|---|---|---|---|
| 2007/0025738 A1* | 2/2007 | Moore | H04B 10/1149 398/189 |
| 2008/0150530 A1* | 6/2008 | Miyoshi | A61B 5/055 324/309 |
| 2009/0046598 A1* | 2/2009 | Krishnaswamy | H04W 48/10 370/254 |
| 2009/0049158 A1* | 2/2009 | Krishnaswamy | H04W 84/22 709/220 |
| 2010/0164784 A1* | 7/2010 | Longstaff | G01S 13/003 342/202 |
| 2013/0181862 A1* | 7/2013 | Matsumoto | G01S 13/38 342/127 |
| 2013/0291013 A1* | 10/2013 | Choi | H04H 20/59 725/33 |
| 2014/0086140 A1* | 3/2014 | Gabara | H04B 7/155 370/315 |
| 2014/0254820 A1* | 9/2014 | Gardenfors | H04R 3/005 381/80 |
| 2014/0289241 A1* | 9/2014 | Anderson | G06F 17/30038 707/736 |
| 2015/0095352 A1* | 4/2015 | Lacey | G06F 17/30011 707/752 |

* cited by examiner

METHOD FOR COMMUNICATION IN AN AD HOC NETWORK

The present invention relates to a method for communication in an ad hoc network and a communication device implementing the method.

The invention is in the field of communications in wireless networks. The invention is in particular suitable for networks of the ad hoc network type without infrastructure comprising mobile communication devices such as networks of the MANET (Mobile Ad hoc NETwork) type.

In a mobile ad hoc network, each communication device in the network is a wireless communication device connected to other communication devices in the network by a set of communication links, this set being able to vary over time. The communication links between two communication devices may be direct communication links i.e. the communications between the two communication devices are without intermediaries, or are indirect, i.e. at least one communication device in the network serves as an intermediary between the two communication devices that are to communicate, for example when the two communication devices that are to communicate are too far apart or separated by an obstacle. The communication links are established automatically by means of a communication protocol for mobile networks, for example of the LSR (Link State Routing) type.

Wireless communications between the communication devices in the network may for example be based on digital telephony standards such as for example the DECT (Digital Enhanced Cordless Telephone) standard or the PHS (Personal Handyphone System) standard or on digital communication standards such as for example the Wi-Fi standard (ISO/IEC 8802-11). The communication devices may then exchange image data, videos, audio data, signalling data, etc. Among the communication devices in the network, one may be a coordinating communication device, referred to as the coordinator device, whereas the other communication devices are subordinate communication devices, referred to as subordinate devices. In some applications of mobile ad hoc networks, the coordinator device is used by a person, referred to as the coordinating person, who is to direct actions undertaken by a set of persons, referred to as subordinate persons, each subordinate person communicating with the coordinating person using a subordinate device. Moreover, the coordinator device may centralise certain operations to be performed during an action such as for example a synchronisation of the clocks of the communication devices in the ad hoc network.

In some applications of mobile ad hoc networks, it is advantageous to be able to determine the relative positions of the communication devices with respect to one another. For example, in order to be able to coordinate an action, it may be important for a coordinating person to know where exactly the subordinate persons that they are directing are situated. The determination of the relative positions generally uses positioning means such as a positioning module, the positioning module being able for example to be integrated directly in the communication device. The positioning module may for example be a satellite positioning module using GPS (Global Positioning System) system, the GLONASS (GLObalnaïa NAvigatsionaïa Spoutnikovaïa Sistéma) positioning system, or the Galileo positioning system.

Satellite positioning systems are very effective outdoors, but much less effective in a confined environment such as a building, or a structure such as a tunnel, an underground location, etc. Communication devices using positioning means better suited to confined environments are known. Positioning means suited to confined environments are for example a positioning module using UWB (ultra-wide band) modulation. UWB modulation is based on a transmission of pulses of very short duration, often less than one nanosecond. UWB modulation generally uses modulation methods of the pulse position modulation (PPM), on off keying (OOK) or dual phase type. UWB modulation may be used to communicate data, in general over short distances. UWB modulation may also be used for positioning. Thus it is possible to equip communication devices that are to position themselves relative to one another in a confined environment, with a positioning module based on use of UWB modulation. Equipped with such a positioning module, a first communication device can obtain information representing a relative position of said first communication device with respect to a second communication device, such as a distance, by sending data to the second communication device in the form of modulated pulses in accordance with UWB modulation, referred to as UWB pulses. The second communication device then evaluates the distance separating from the first communication device by measuring the propagation time of the UWB pulses and retransmits this information to the first communication device. It is also possible to determine relative positions of each communication device in an ad hoc network comprising at least three communication devices by using a triangulation method.

One feature of mobile ad hoc networks is that each communication device may have an independent movement. The movements of the communication device give rise to variations in the communication conditions. Thus, from one moment to another, a communication device may have its communication capabilities decrease until it can no longer communicate with the other communication devices in the network. A reduction in the communication capabilities of a communication device may be caused by interference phenomena. It is known that the DECT, PHS or Wi-Fi wireless communication standards are particularly sensitive to interference phenomena due to reflections of radio waves on obstacles such as walls, which is particularly frequent in a confined space. However, some applications of mobile ad hoc networks require constant communication between the subordinate persons and the coordinating person.

It is desirable to overcome these various drawbacks of the prior art.

It is in particular desirable to provide a mobile ad hoc network in which the communications between the communication devices are preserved as far as possible. It is in particular desirable to overcome deficiencies in the wireless communication means while providing a solution that is simple to implement and at low cost.

According to a first aspect, the present invention relates to a method for communication in an ad hoc network, the ad hoc network comprising a coordinating mobile communication device, referred to as the coordinator device, and a plurality of subordinate mobile communication devices, referred to as subordinate devices, each communication device comprising a wireless communication module and a positioning module using a transmission of first pulses modulated in accordance with a first ultra-wide band modulation in order to determine information representing a position of said communication device. The method comprises the following steps when it is implemented by a communication device: obtaining data to be transmitted; checking a transmission capability of the wireless communication module; when the wireless communication module does not allow to transmit the data, using the positioning module to transmit said data in the form of second pulses orthogonal to the first pulses.

In this way, the invention allows to take advantage of the positioning module using a pulse modulated transmission in accordance with an ultra-wide band modulation in order to overcome deficiencies of the wireless communication module.

According to one embodiment, the positioning module uses a first antenna having a first polarity to transmit the first pulses and a second antenna having a polarity orthogonal to the first polarity to transmit the second pulses.

Use of antennas with orthogonal polarities allows to obtain first and second orthogonal ultra-wide band pulses and thus to avoid the use of the positioning module for implementing a communication function affecting the positioning capabilities of the positioning module.

According to one embodiment, the step of using the positioning module for transmitting said data in the form of second pulses orthogonal to the first pulses comprises a step of obtaining a second ultra-wide band modulation allowing to obtain second pulses orthogonal to the first pulses, said data being transmitted using the second modulation.

Use of a modulation allowing to obtain, for implementation of a communication function by the positioning module, ultra-wide band pulses orthogonal to the ultra-wide band pulses used for implementing the positioning function of the positioning module, allows to prevent the use of the positioning module for implementing the communication function affecting the positioning capabilities of the positioning module.

According to one embodiment, the first and second modulations are pulse position modulations allowing to obtain pulses, referred to as composite pulses, comprising at least one unitary pulse, each unitary pulse being represented by the following formula:

$$I_n(t) = P_n(t)G(t)$$

where n is an index taking a different integer value for the first or second modulation, $P_n(t)$ is an $n^{th}$ degree polynomial such that $P_n(t) = \Sigma_{k=0}^{k=n} a_{k,n} t^k$, where $a_{k,n}$ is a coefficient of the $n^{th}$ degree polynomial, k an integer number and t a variable representing time, G(t) is a Gaussian function such that $$G(t) = \frac{1}{\sqrt{2\pi}\,\sigma} e^{-\frac{t^2}{2\sigma^2}};$$

the unitary pulses included in a composite pulse being orthogonal in pairs and at least one unitary pulse of a composite pulse obtained by the first modulation being orthogonal to each unitary pulse of a composite pulse obtained by the second modulation.

The invention provides a generic method for obtaining orthogonal ultra-wide band pulses.

According to one embodiment, the coefficients $a_{k,n}$ of the polynomials are obtained iteratively by determining first the coefficient of the polynomial with the lowest degree, and then determining successively the coefficients of the higher-degree polynomials.

According to a second aspect of the invention, the invention relates to a mobile communication device included in an ad hoc network, said mobile communication device comprising a wireless communication module for communicating data with other mobile communication devices in the ad hoc network and a positioning module using a transmission of first pulses modulated in accordance with a first ultra-wide band modulation for determining information representing a position of said communication device. Said device comprises: means for obtaining data to be transmitted; checking means for checking a transmission capability of the wireless communication module; transmission means for transmitting said data in the form of second pulses orthogonal to the first pulses using the positioning module.

According to a third aspect of the invention, the invention relates to a communication system comprising a plurality of mobile communication devices according to the second aspect.

According to a fourth aspect of the invention, the invention relates to a computer program comprising instructions for the implementation, by a device, of the method according to the first aspect, when said program is executed by a processor of said device.

According to a fifth aspect, the invention relates to storage means storing a computer program comprising instructions for the implementation, by a device, of the method according to the first aspect, when said program is executed by a processor of said device.

The features of the invention mentioned above, as well as others, will emerge more clearly from a reading of the following description of an example embodiment, said description being given in relation to the accompanying drawings, among which:

The invention is described hereinafter in the case of a mobile ad hoc network in which one communication device is a coordinator device, the other communication devices being subordinate devices. The invention is applicable in a context where the coordinator device role is not definitively allocated to one of the communication devices in the ad hoc network, but on the contrary each communication device may, at a given moment, become the coordinator device, the previous coordinator device becoming a subordinate device once again.

Moreover, the present invention applies to all derivatives of the LSR networks, that is to say, for example, networks using the OSPF ("Open Shortest Path First") standard, and optimised versions of the OSPF standard, such as OLSR ("Optimised Link State Routing") or MARP ("Mobility Aware Routing Protocol").

Figure 1:
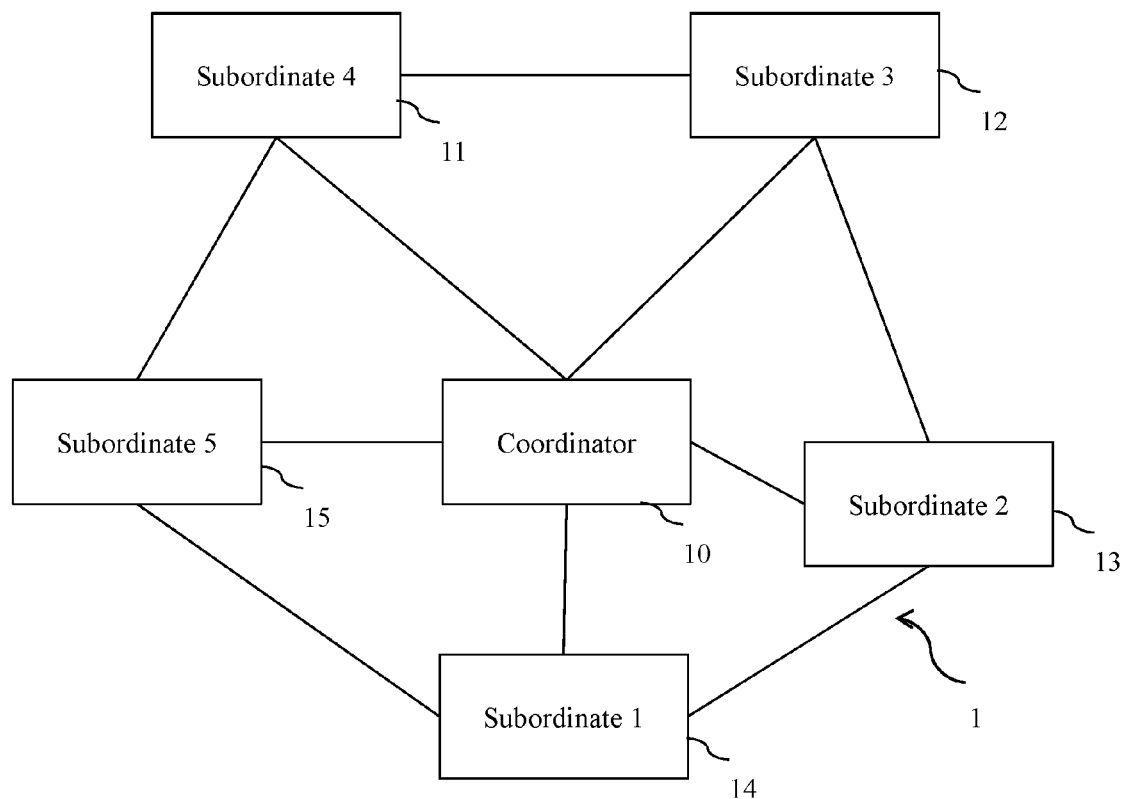
FIG. 1 illustrates schematically an ad hoc network comprising a plurality of communication devices.

FIG. 1 illustrates schematically an ad hoc network 1 comprising a plurality of communication devices 10, 11, 12, 13, 14 and 15. Each communication device 10, 11, 12, 13, 14 and 15 is mobile since it is carried, for example, by a person. The communication device 10 is a coordinator device carried for example by a coordinating person in an action. The communication devices 11 to 15 are subordinate devices carried for example by subordinate persons directed in the action by the coordinating person.

Figure 2:
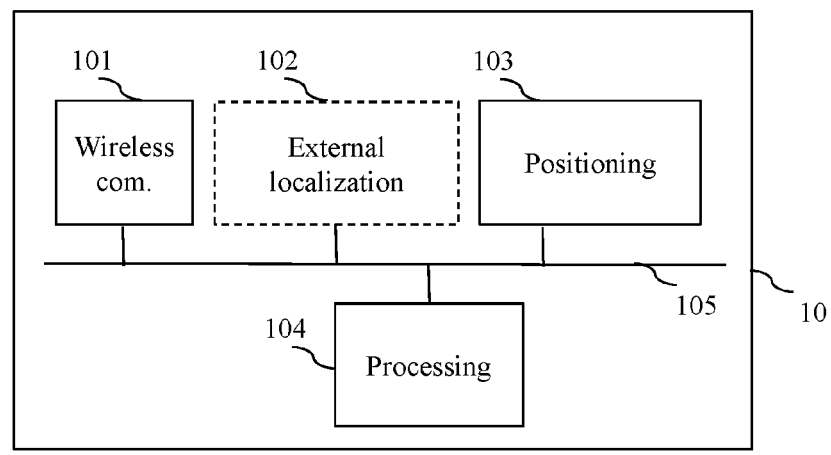
FIG. 2 illustrates schematically a communication device according to the invention.

FIG. 2 illustrates schematically a communication device according the invention. We take here the example of a communication module 10. However, the modules 10 to 15 are all identical. The communication device 10 comprises, connected by a communication bus 105, a wireless communication module 101, a positioning module 103 and a processing module 104. The wireless communication module 101 is for example a DECT module enabling the communication device 10 to communicate with the other communication devices 11 to 15. The positioning module 103 uses a UWB modulation to obtain information representing a relative position of the communication device 10 with respect to the communication devices 11 to 15, in accordance with a method that we describe in relation to FIG. 4. The processing module is described hereinafter in relation to FIG. 3.

In one embodiment, the communication device 10 comprises an external location module 102 such as a GPS, GLONASS or Galileo module.

In one embodiment, the wireless communication module 101 could just as well be a PHS or Wi-Fi module.

Figure 3:
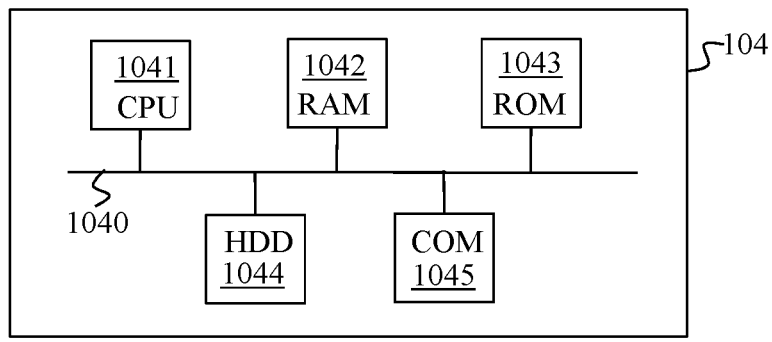
FIG. 3 illustrates schematically an example of hardware architecture of a processing module of a communication device according to the invention.

FIG. 3 illustrates schematically a hardware architecture of the processing module 104.

According to the example of hardware architecture shown in FIG. 3, the processing module 104 then comprises, connected by a communication bus 1040; a processor or CPU (central processing unit) 1041; a random access memory (RAM) 1042; a read only memory (ROM) 1043; a storage unit such as a hard disk or a storage medium reader such as an SD (secure digital) card reader 1044; at least one communication interface 1045 enabling the processing module 104 to communicate with the wireless communication module 101, the positioning module 103 and the external location 102 if present.

The processor 1041 is capable of executing instructions loaded into the RAM 1402 from the ROM 1043, from an external memory (not shown), from a storage medium (such as an SD card), or from a communication network. When the processing module 104 is powered up, the processor 1041 is capable of reading instructions from the RAM 1042 and executing them. These instructions form a computer program causing the implementation, by the processor 1041, of all or some of the algorithms and steps described below in relation to FIGS. 4, 5 and 6. The functioning of the processor 1041 is timed by an internal clock, not shown.

All or some of the algorithms and steps described below in relation to FIGS. 4, 5 and 6 may be implemented in software form by the execution of a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

Figure 4:
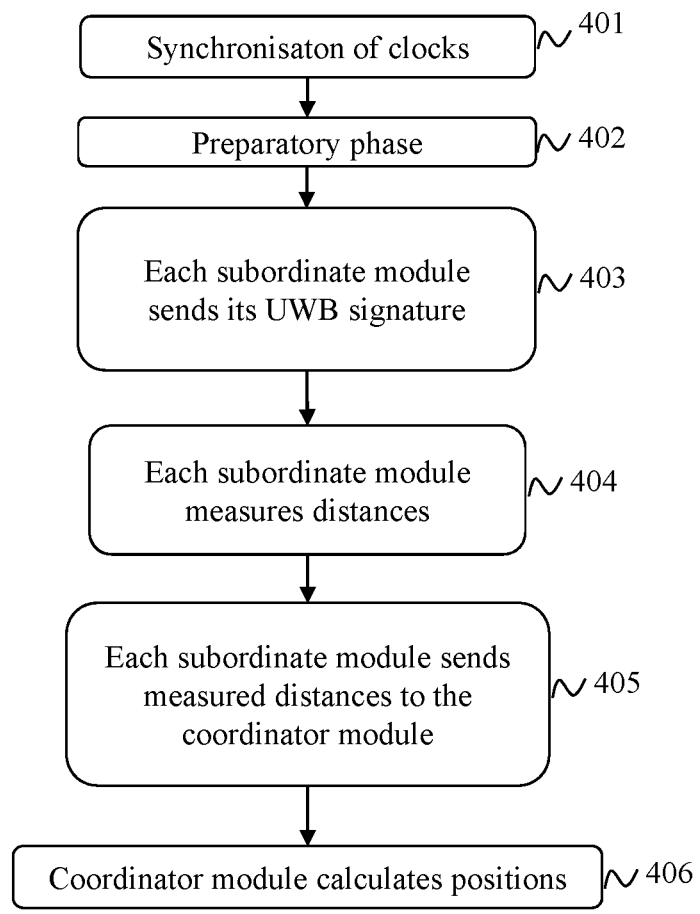
FIG. 4 illustrates schematically a method for determining relative positions of communication devices in an ad hoc network.

FIG. 4 illustrates schematically a method for determining relative positions of communication devices in an ad hoc network. This method is implemented in the ad hoc network 1 in order to determine the relative positions of the communication devices 10 to 15.

The method begins with a step 401 of synchronisation of the internal clocks of the processing module 104 of each processing device 10 to 15. Each processing module 104 synchronises its internal clock using information obtained during wireless communications using the wireless communication module 101, here a DECT module. In order to communicate, the DECT module uses a multiplexing mode known as time distribution multiple access (TDMA) over a shared communication period known as a frame. The frames are repeated cyclically and have a fixed duration known to each communication module 10 to 15. Each communication device 10 to 15 has a common time reference $T_0$ corresponding to the start of a frame. The time reference $T_0$ is kept synchronous between the communication devices 10 to 15 by the transmission by the coordinator device 10 of a DECT synchronisation signal. Each communication unit 11 to 15 synchronises its internal clock on this DECT synchronisation signal.

In an embodiment of the synchronisation step 401, the coordinator device 10 synchronises its internal clock on an internal clock of the external location module 102 when this is implemented by a GPS, GLONASS or Galileo module. In this way, the whole of ad hoc network is synchronised on an absolute clock given by the external location module 102.

The synchronisation step 401 is followed by a step 402 referred to as the preparatory phase during which the coordinator device 10 transmits information to each subordinate device 11 to 15 enabling each subordinate device 11 to 15 to identify itself uniquely when the method for determining relative positions is implemented. To do this the coordinator device 10 transmits an identification table specific to each subordinate device. The identification table transmitted to a subordinate device comprises the following elements: a specific identifier for said subordinate device, a UWB signature specific for said subordinate device and a transmission delay period specific for the subordinate device.

The identifier takes the form of an integer number.

The UWB signature consists of a string of non-periodic UWB pulses. The pulse string is characterised by a duration, a number of UWB pulses over said duration and a time distribution of the UWB pulses over said duration that are specific to a communication device and thus allow to recognise it.

The transmission delay period corresponds to a duration separating the common time reference $T_0$ corresponding to the start of frame and the start of the transmission of the UWB signature. The transmission delay period allows to avoid two communication devices sending data at the same time during a frame.

During the preparatory phase, each subordinate device 11 to 15 receives from the coordinator device 10 the identification table for the other subordinate devices in the ad hoc network.

At the end of the preparatory phase, each communication devices 10 to 15 has the information enabling it to identify itself in the ad hoc network 1 and to identify the other communication devices in the ad hoc network 1.

Following the preparatory phase represented by step 402, the method for determining the relative positions enters an operating phase represented by steps 403 to 406.

During step 403, each subordinate module sends its signature. This transmission takes place in a frame, each subordinate module respecting the order of transmission of signatures given by the transmission delay periods.

During step 404, when a communication device, referred to as the receiving device, receives a signature, it identifies the communication device originating the transmission of this signature, referred to as the transmitting device, and measures the distance separating the transmitting device from the receiving device. During step 404, each communication device 10 to 15 in the ad hoc network 1 stores the distances that it has been able to measure.

In step 405, each subordinate module 11 to 15 transmits each distance that it had been able to measure to the coordinator module 10 using the wireless communication module 101.

During step 406, the coordinator device determines the relative positions of the subordinate devices from the distances that it has received in accordance with a method analogous to a triangulation. In the example of the ad hoc network 1, this determination, implemented by the processing module 104, may for example be done in the following manner.

The processing module 104 defines an orthogonal reference frame (O, x, y) centred on the position of the coordinator device 10. Let $(x_{10}, y_{10})$, $(x_{11}, y_{11})$, $(x_{12}, y_{12})$, $(x_{13}, y_{13})$, $(x_{14}, y_{14})$, and $(x_{15}, y_{15})$ be the respective coordinates of the communication devices 10, 11, 12, 13, 14 and 15 in the orthogonal reference frame (O, x, y) and $D_{i\text{-}j}$ ($i \in [10; 14]$, $j[11; 15]$, $i \neq j$) the distances separating the coordinator device 10 and respectively the subordinate devices 11, 12, 13, 14 and 15.

The following system of equations can then be written:

$$D_{10\text{-}11} = \sqrt{(x_{11}-x_{10})^2 + (y_{11}-y_{10})^2}$$

$$D_{10\text{-}12} = \sqrt{(x_{12}-x_{10})^2 + (y_{12}-y_{10})^2}$$

$$D_{10\text{-}13} = \sqrt{(x_{13}-x_{10})^2 + (y_{13}-y_{10})^2}$$

$$D_{10\text{-}14} = \sqrt{(x_{14}-x_{10})^2 + (y_{14}-y_{10})^2}$$

$$D_{10\text{-}15} = \sqrt{(x_{15}-x_{10})^2 + (y_{15}-y_{10})^2}$$

$$D_{11\text{-}12} = \sqrt{(x_{12}-x_{11})^2 + (y_{12}-y_{11})^2}$$

$$D_{11\text{-}13} = \sqrt{(x_{13}-x_{11})^2 + (y_{13}-y_{11})^2}$$

$$D_{11\text{-}14} = \sqrt{(x_{14}-x_{11})^2 + (y_{14}-y_{11})^2}$$

$$D_{11\text{-}15} = \sqrt{(x_{15}-x_{11})^2 + (y_{15}-y_{11})^2}$$

$$D_{12\text{-}13} = \sqrt{(x_{13}-x_{12})^2 + (y_{13}-y_{12})^2}$$

$$D_{12\text{-}14} = \sqrt{(x_{14}-x_{12})^2 + (y_{14}-y_{12})^2}$$

$$D_{12\text{-}15} = \sqrt{(x_{15}-x_{12})^2 + (y_{15}-y_{12})^2}$$

$$D_{13\text{-}14} = \sqrt{(x_{14}-x_{13})^2 + (y_{14}-y_{13})^2}$$

$$D_{13\text{-}15} = \sqrt{(x_{15}-x_{13})^2 + (y_{15}-y_{13})^2}$$

$$D_{14\text{-}15} = \sqrt{(x_{15}-x_{14})^2 + (y_{15}-y_{14})^2}$$

All the distances $D_{i\text{-}j}$ being known, we therefore obtain, in this example, a system of fifteen equations with ten unknowns, $(x_{10}, y_{10})$ being the origin of the orthogonal reference frame. The solving of this system by the processing module 104 uses solution methods known to persons skilled in the art, such as substitution methods. In this way, the relative position of each subordinate device 11 to 15 with respect to the coordinator device 10 is obtained.

In one embodiment, the coordinator module 10 uses its external location module 102 in order to determine its absolute position and calculates the absolute positions of each subordinate device 11 to 15 from the absolute position determined and the relative positions that it has calculated.

In one embodiment, the coordinator device retransmits the relative or absolute positions that it has determined to each subordinate device 11 to 15. In this way, each subordinate device 11 to 15 knows the relative or absolute position of each communication device 10 to 15 in the ad hoc network 1.

In one embodiment, each subordinate device successively transmits a plurality of signatures so as to enable each communication device receiving this signature to refine its distance measurement, for example by averaging a plurality of distances measured.

Figure 5:
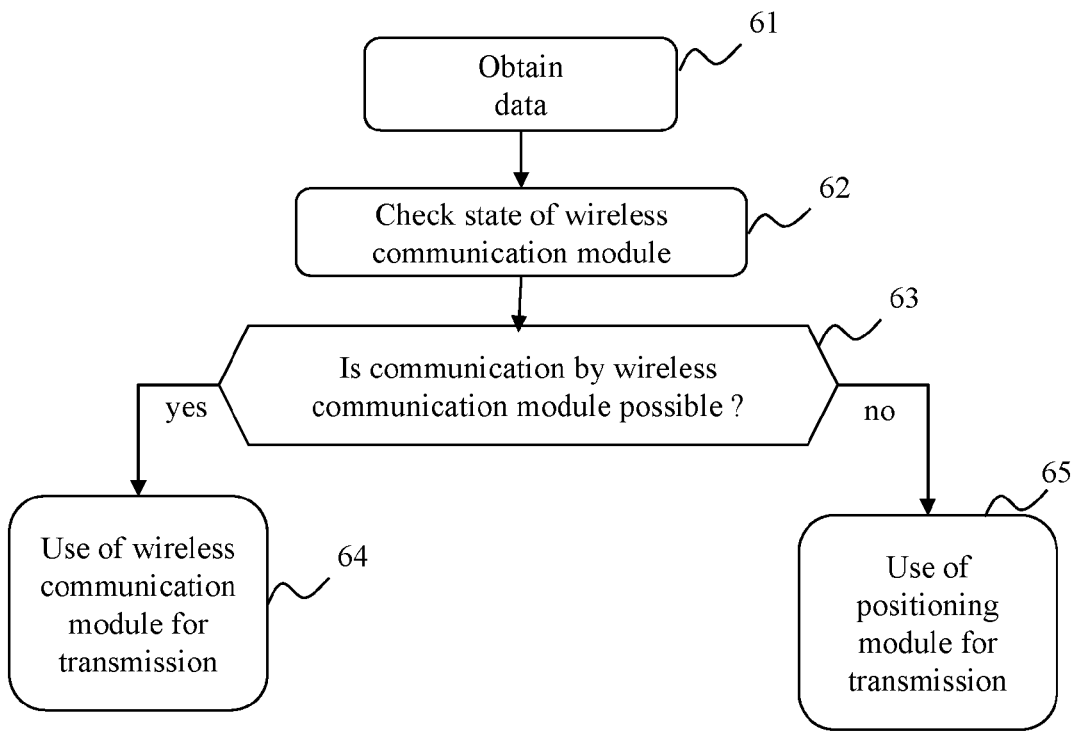
FIG. 5 illustrates schematically a communication method according to the invention implemented by a communication device in the ad hoc network.

FIG. 5 illustrates schematically a communication method according to the invention implemented by a communication device 10, 11, 12, 13, 14 or 15 in the ad hoc network 1. We take here the example of the subordinate device 11. However, the devices 10, 12, 13, 14 and 15 implement the same method.

In a step 61, the processing module 104 obtains data to be transmitted as well as information representing one or more communication devices for which these data are intended. The data to be transmitted may for example be audio data, images, videos, etc.

In a step 62, the processing module 104 transmits a request to the wireless communication module 101 in order to determine the communication capabilities of the wireless communication module with the communication device or devices for which the data are intended. When it receives said request, the wireless communication module 101 determines its communication capabilities with each destination communication device. To do this, for example, the wireless communication module 101 transmits a test message to each communication device. Each destination communication device receiving the test message responds by sending an acknowledgement of receipt to the wireless communication module 101 comprising information representing a reception quality of the message. The information representing a reception quality of the message may for example be an RSSI (received signal strength indication) measurement. The wireless communication module 101 next communicates the information representing the reception qualities that it has obtained to the processing module 104.

During a step 63, the processing module 104 determines, from the information representing the reception qualities, whether a communication using the wireless communication module 101 is possible. Thus, for each destination communication device, the processing module 104 determines, when a destination communication device has transmitted information representing a communication quality below a predefined threshold or said destination communication device has not transmitted an acknowledgement of receipt, that a communication using the wireless communication module 101 is not possible. The processing module 104 then decides to use the positioning module 103 to communicate with said destination communication device. The communication with said destination communication device is then implemented during a step 65. We detail hereinafter two examples of implementation of step 65, one of these examples being detailed in relation to FIG. 6.

If on the other hand, during step 63, a destination communication device has transmitted information representing a communication quality above or equal to the predefined threshold, the processing device 104 decides to use the wireless communication module 101 to communicate with said destination communication device. The communication using the wireless communication module 104 is implemented during a step 64.

In one embodiment, prior to the implementation of a communication using the positioning module 103 between the subordinate device 11 and one of the communication devices 10 and 12 to 15 with which a communication using the wireless communication module 101 is impossible, referred to as a non-reachable device, the processing device 104 of the subordinate device 11 determines whether the communication using the positioning module is possible. To do this, the processing module 104 determines whether, in the context of the implementation of the method for determining the relative positions of the communication device described in relation to FIG. 4, a distance has been able to be determined between the subordinate device 11 and the non-reachable device. To do this, for example, during step 404, when a communication device has received a signature and it has been able to determine the distance separating it from the communication device that sent the signature, the communication device that received the signature transmits the signature to the device that sent the signature. In this way, each communication device that sent a signature knows with which communication device it can communicate by means of the positioning module 103.

A main function of a positioning module 103 of a communication device 10, 11, 12, 13, 14 or 15 is to provide positioning means to said communication device. When the positioning module 103 is used to fulfil a communication function, the implementation of this function must not interfere with the positioning function. So that the two functions can cohabit, the implementation of two functions in the positioning module uses different UWB modulations allowing to manage orthogonal UWB pulses.

It is possible to obtain orthogonal UWB pulses in various ways.

In one embodiment, each function of the positioning module uses a dedicated UWB antenna, the UWB antenna used in the positioning function having a polarisation orthogonal to the UWB antenna used for the communication function. Each antenna is, for example, implemented by a planar antenna ("patch") the radiating element of which is a generally square or rectangular conductive surface separated from a conductive reflective surface by a dielectric sheet. The two antennas are sufficiently spaced apart from each other to reduce their mutual coupling. The positioning function may for example use an antenna having a horizontal polarisation, and the communication function may use an antenna having a vertical polarisation.

In one embodiment, each function of the positioning module uses a dedicated UWB modulation. The UWB modulation used in the positioning function allows to obtain composite UWB pulses orthogonal to composite UWB pulses obtained by the UWB modulation used in the communication function. Composite UWB pulse means a UWB pulse comprising at least one unitary UWB pulse. A composite pulse comprising a plurality of unitary UWB pulses results from a concatenation of said unitary UWB pulses.

Figure 7A:
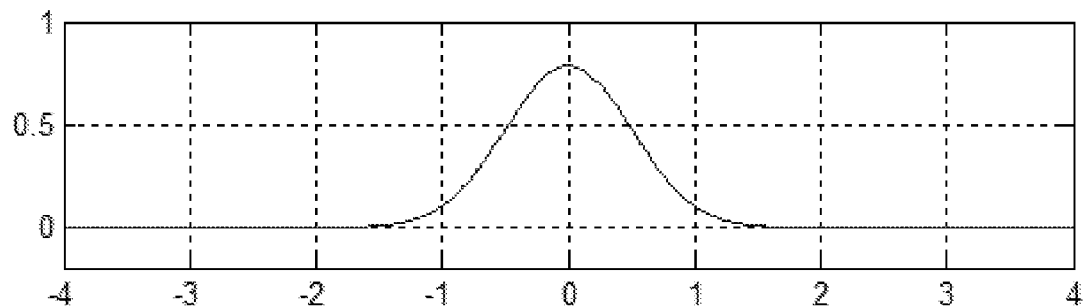
FIGS. 7A, 7B and 7C show examples of UWB pulses orthogonal in pairs used in the present invention.
Figure 7B:
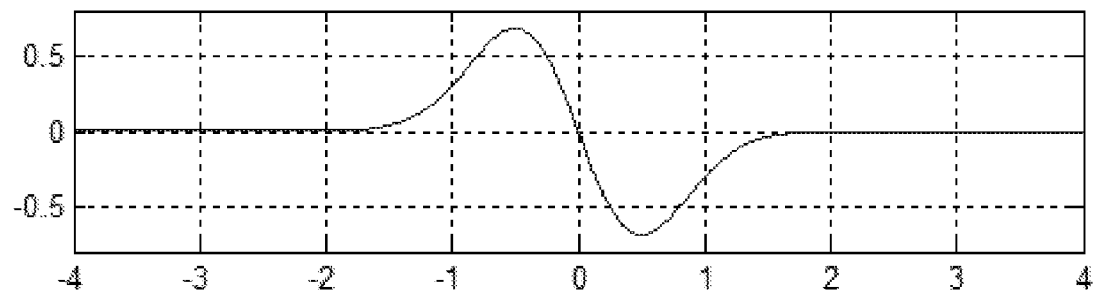
Figure 7C:
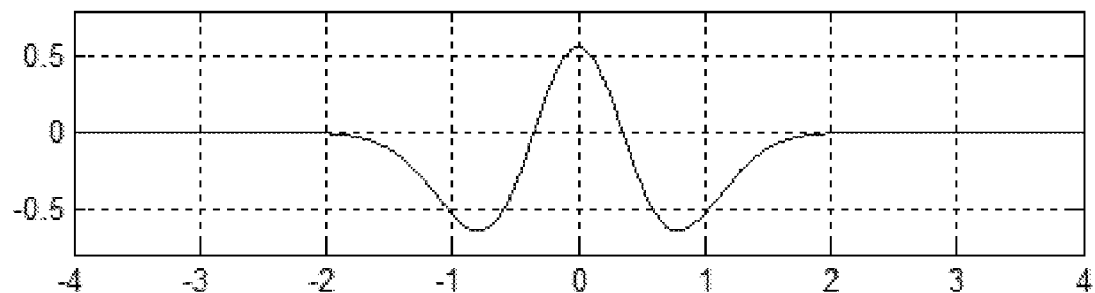

FIGS. 7A, 7B and 7C show examples of unitary UWB pulses orthogonal in pairs used in the present invention.

The horizontal axes represent the time expressed in nanoseconds and the vertical axes represent amplitudes expressed in volts or in a predetermined voltage unit.

FIG. 7a shows a unitary UWB pulse α(t) having the equation:

$$\alpha(t) = \frac{K}{\sqrt{2\pi}\,\sigma} e^{-\frac{t^2}{2\sigma^2}}$$

where K is a normalization coefficient, σ is a standard deviation of a Gaussian between $10^{-10}$ and $10^{-9}$s. For example, K is equal to $10^{-9}$ and σ=0.5 ns.

FIG. 7b shows a unitary UWB pulse β(t) having the equation:

$$\beta(t) = \frac{K}{\sqrt{\pi}\,\sigma}\left(-\frac{t}{\sigma}\right)e^{-\frac{t^2}{2\sigma^2}}$$

FIG. 7c shows a unitary UWB pulse γ(t) having the equation:

$$\gamma(t) = \frac{K}{2\sqrt{\pi}\,\sigma}\left(1 - 2\left(\frac{t}{\sigma}\right)^2\right)e^{-\frac{t^2}{2\sigma^2}}$$

The unitary UWB pulses α(t), β(t) and γ(t) are orthogonal in pairs.

In general terms, a unitary UWB pulse of index n can be represented by the following formula:

$$I_n(t) = P_n(t)G(t)$$

where $P_n(t)$ is an $n^{th}$ degree polynomial n ($P_n(t) = \sum_{k=0}^{k=n} a_{k,n} t^k$) where $a_{k,n}$ is a coefficient of the $n^{th}$ degree polynomial, k an integer number n is the index of the ultra-wide band pulse and t is the time, G(t) is a Gaussian function $$\left(G(t) = \frac{1}{\sqrt{2\pi}\,\sigma} e^{-\frac{t^2}{2\sigma^2}}\right).$$

The orthogonality of two unitary UWB pulses can be expressed in the form of a null scalar product.

A scalar product $\mathcal{S}_{m,n}$ between two unitary UWB pulses can be written as follows:

$$\mathcal{S}_{m,n} = \int_{-28}^{+\infty} I_m(t) I_n(t) dt = \delta_{m,n}$$

where $\delta_{m,n}$ designates the Kronecker symbol:

$$\begin{cases} \delta_{m,n} = 0 \ si \ m \neq n \\ \delta_{m,n} = 1 \ si \ m = n \end{cases}$$

Let there be the following formula $$U_n = \int_0^{+\infty} t^n e^{-at^b} dt = \frac{1}{b} a^{-\frac{n+1}{b}} \Gamma\left(\frac{n+1}{b}\right)$$

where Γ designates the gamma function:

$$\Gamma : x \mapsto \int_0^{+\infty} t^{x-1} e^{-t} dt$$

Let $V_n$ be the following integral:

$$V_n = \int_{-\infty}^{+\infty} t^n e^{-at^b} dt$$

where a and b are constants, for example $$a = \frac{1}{\sigma^2} \text{ et } b = 2$$

If n is even then we have:

$$V_n = \int_{-\infty}^{+\infty} t^n e^{-\frac{t^2}{\sigma^2}} dt = 2U_n = 2\int_0^{+\infty} t^n e^{-\frac{t^2}{\sigma^2}} dt = \sigma^{n+1}\Gamma\left(\frac{n+1}{2}\right)$$

Otherwise $$V_n = 0$$

From this result, the scalar product $S_{m,n}$ can be calculated iteratively starting from m=0.

For m=0:

$$S_{0,0} = \int_{-\infty}^{+\infty} I_0(t)I_0(t)dt = \int_{-\infty}^{+\infty} I_0^2(t)dt = 1$$

$$\int_{-\infty}^{+\infty} P_0^2(t)G^2(t)dt = \int_{-\infty}^{+\infty} a_{0,0}^2 \frac{1}{2\pi\sigma^2} e^{-\frac{t^2}{\sigma^2}} dt = 1$$

$$a_{0,0}^2 \int_{-\infty}^{+\infty} e^{-\frac{t^2}{\sigma^2}} dt = a_{0,0}^2 \Gamma\left(\frac{1}{2}\right)\sigma = 2\pi\sigma^2$$

$$a_{0,0}^2 \Gamma\left(\frac{1}{2}\right)\sigma = 2\pi\sigma^2$$

$$a_{0,0} = \pm\sqrt{\frac{2\pi\sigma}{\Gamma\left(\frac{1}{2}\right)}} = \pm\sqrt{2\sqrt{\pi}\,\sigma}$$

For m=1, two equations are to be written: $S_{1,1}=1$ and $S_{0,1}=0$ $$S_{1,1} = \int_{-\infty}^{+\infty} I_1(t)I_1(t)dt = \int_{-\infty}^{+\infty} I_1^2(t)dt = 1$$

$$\int_{-\infty}^{+\infty} P_1^2(t)G^2(t)dt = \int_{-\infty}^{+\infty} (a_{1,1}t + a_{0,1})^2 \frac{1}{2\pi\sigma^2} e^{-\frac{t^2}{\sigma^2}} dt = 1$$

$$\frac{1}{2\pi\sigma^2}\int_{-\infty}^{+\infty} (a_{1,1}^2 t^2 + 2a_{1,1}a_{0,1}t + a_{0,1}^2)e^{-\frac{t^2}{\sigma^2}} dt = 1$$

$$a_{1,1}^2 \int_{-\infty}^{+\infty} t^2 e^{-\frac{t^2}{\sigma^2}} dt + 2a_{1,1}a_{0,1}\int_{-\infty}^{+\infty} te^{-\frac{t^2}{\sigma^2}} dt + a_{0,1}^2 \int_{-\infty}^{+\infty} e^{-\frac{t^2}{\sigma^2}} dt = 2\pi\sigma^2$$

$$a_{1,1}^2 \Gamma\left(\frac{3}{2}\right)\sigma^3 + a_{0,1}^2 \Gamma\left(\frac{1}{2}\right)\sigma = 2\pi\sigma^2$$

$$a_{1,1}^2 \Gamma\left(\frac{3}{2}\right)\sigma^2 + a_{0,1}^2 \Gamma\left(\frac{1}{2}\right) = 2\pi\sigma$$

$$a_{1,1}^2 \Gamma\left(\frac{3}{2}\right)\sigma^2 + a_{0,1}^2 \Gamma\left(\frac{1}{2}\right) = 2\pi\sigma$$

$$S_{0,1} = \int_{-\infty}^{+\infty} I_0(t)I_1(t)dt = 0$$

$$\int_{-\infty}^{+\infty} P_0(t)P_1(t)G^2(t)dt = \int_{-\infty}^{+\infty} a_{0,0}(a_{1,1}t + a_{0,1})\frac{1}{2\pi\sigma^2}e^{-\frac{t^2}{\sigma^2}} dt = 0$$

$$a_{1,1}\int_{-\infty}^{+\infty} te^{-\frac{t^2}{\sigma^2}} dt + a_{0,1}\int_{-\infty}^{+\infty} e^{-\frac{t^2}{\sigma^2}} dt = 0$$

$$a_{0,1}\Gamma\left(\frac{1}{2}\right)\sigma = 0$$

$$\Rightarrow a_{0,1} = 0$$

From which:

$$a_{1,1} = \pm\sqrt{\frac{2\pi}{\Gamma\left(\frac{3}{2}\right)\sigma}} = \pm 2\sqrt{\frac{\sqrt{\pi}}{\sigma}}$$

For m=2, three equations are to be written: $S_{2,2}=1$, $S_{0,2}=0$ and $S_{1,2}=0$ $$S_{2,2} = \int_{-\infty}^{+\infty} I_2(t)I_2(t)dt = \int_{-\infty}^{+\infty} I_2^2(t)dt = 1$$

$$\int_{-\infty}^{+\infty} P_2^2(t)G^2(t)dt = \int_{-\infty}^{+\infty} (a_{2,2}t^2 + a_{1,2}t + a_{0,2})^2 \frac{1}{2\pi\sigma^2} e^{-\frac{t^2}{2\sigma^2}} dt = 1$$

$$\frac{1}{2\pi\sigma^2}\int_{-\infty}^{+\infty} (a_{2,2}^2 t^4 + a_{1,2}^2 t^2 + a_{0,2}^2 + 2a_{2,2}a_{1,2}t^3 + 2a_{2,2}a_{0,2}t^2 + 2a_{1,2}a_{0,2}t)e^{-\frac{t^2}{\sigma^2}} dt = 1$$

$$\frac{1}{2\pi\sigma^2}\int_{-\infty}^{+\infty} (a_{2,2}^2 t^4 + 2a_{2,2}a_{1,2}t^3 + (a_{1,2}^2 + 2a_{2,2}a_{0,2})t^2 + 2a_{1,2}a_{0,2}t + a_{0,2}^2)e^{-\frac{t^2}{\sigma^2}} dt = 1$$

$$a_{2,2}^2 \int_{-\infty}^{+\infty} t^4 e^{-\frac{t^4}{4\sigma^2}} dt + (a_{1,2}^2 + 2a_{2,2}a_{0,2})\int_{-\infty}^{+\infty} t^2 e^{-\frac{t^4}{4\sigma^2}} dt + a_{0,2}^2 \int_{-\infty}^{+\infty} e^{-\frac{t^2}{\sigma^2}} dt = 2\pi\sigma^2$$

$$a_{2,2}^2 \Gamma\left(\frac{5}{2}\right)\sigma^5 + (a_{1,2}^2 + 2a_{2,2}a_{0,2})\Gamma\left(\frac{3}{2}\right)\sigma^3 + a_{0,2}^2 \Gamma\left(\frac{1}{2}\right)\sigma = 2\pi\sigma^2$$

$$a_{2,2}^2 \Gamma\left(\frac{5}{2}\right)\sigma^4 + (a_{1,2}^2 + 2a_{2,2}a_{0,2})\Gamma\left(\frac{3}{2}\right)\sigma^2 + a_{0,2}^2 \Gamma\left(\frac{1}{2}\right) = 2\pi\sigma$$

$$a_{2,2}^2 \Gamma\left(\frac{5}{2}\right)\sigma^4 + (a_{1,2}^2 + 2a_{2,2}a_{0,2})\Gamma\left(\frac{3}{2}\right)\sigma^2 + a_{0,2}^2 \Gamma\left(\frac{1}{2}\right) = 2\pi\sigma$$

$$S_{0,2} = \int_{-\infty}^{+\infty} I_0(t)I_2(t)dt = 0$$

$$\int_{-\infty}^{+\infty} P_0(t)P_2(t)G^2(t)dt = \int_{-\infty}^{+\infty} a_{0,0}(a_{2,2}t^2 + a_{1,2}t + a_{0,2})\frac{1}{2\pi\sigma^2}e^{-\frac{t^2}{\sigma^2}} dt = 0$$

$$\int_{-\infty}^{+\infty} (a_{2,2}t^2 + a_{1,2}t + a_{0,2})e^{-\frac{t^2}{\sigma^2}} dt = 0$$

$$a_{2,2}\int_{-\infty}^{+\infty} t^2 e^{-\frac{t^2}{\sigma^2}} dt + a_{0,2}\int_{-\infty}^{+\infty} e^{-\frac{t^2}{\sigma^2}} dt = 0$$

$$a_{2,2}\Gamma\left(\frac{3}{2}\right)\sigma^3 + a_{0,2}\Gamma\left(\frac{1}{2}\right)\sigma = 0$$

$$a_{2,2}\Gamma\left(\frac{3}{2}\right)\sigma^2 + a_{0,2}\Gamma\left(\frac{1}{2}\right) = 0$$

$$S_{1,2} = \int_{-\infty}^{+\infty} I_1(t)I_2(t)dt = 0$$

$$\int_{-\infty}^{+\infty} P_1(t)P_2(t)G^2(t)dt =$$

$$\int_{-\infty}^{+\infty} (a_{1,1}t + a_{0,1})(a_{2,2}t^2 + a_{1,2}t + a_{0,2})\frac{1}{2\pi\sigma^2}e^{-\frac{t^2}{\sigma^2}} dt = 0$$

-continued $$\frac{1}{2\pi\sigma^2}\int_{-\infty}^{+\infty}(a_{2,2}a_{1,1}t^3 + (a_{2,2}a_{0,1}+a_{1,2}a_{1,1})t^2 + (a_{0,2}a_{1,1}+a_{1,2}a_{0,1})t + a_{0,2}a_{0,1})$$

$$e^{-\frac{t^2}{\sigma^2}}dt = 0$$

$$(a_{2,2}a_{0,1}+a_{1,2}a_{1,1})\int_{-\infty}^{+\infty}t^2 e^{-\frac{t^2}{\sigma^2}}dt + a_{0,2}a_{0,1}\int_{-\infty}^{+\infty}e^{-\frac{t^2}{\sigma^2}}dt = 0$$

$$(a_{2,2}a_{0,1}+a_{1,2}a_{1,1})\Gamma\left(\frac{3}{2}\right)\sigma^3 + a_{0,2}a_{0,1}\Gamma\left(\frac{1}{2}\right)\sigma = 0$$

$$(a_{2,2}a_{0,1}+a_{1,2}a_{1,1})\Gamma\left(\frac{3}{2}\right)\sigma^2 + a_{0,2}a_{0,1}\Gamma\left(\frac{1}{2}\right) = 0$$

$$\pm a_{1,2}\sqrt{\frac{2\pi}{\Gamma\left(\frac{3}{2}\right)\sigma}}\Gamma\left(\frac{3}{2}\right)\sigma^2 = 0$$

$$\Rightarrow a_{1,2} = 0$$

Thus $$a_{2,2} = \pm\sqrt{\frac{2\pi}{\left(\Gamma\left(\frac{5}{2}\right)-\frac{\Gamma^2\left(\frac{3}{2}\right)}{\Gamma\left(\frac{1}{2}\right)}\right)\sigma^3}} = \pm 2\sqrt{\frac{\sqrt{\pi}}{\sigma^2}}$$

And:

$$a_{0,2} = \mp\sqrt{\frac{2\pi\Gamma^2\left(\frac{3}{2}\right)\sigma}{\Gamma\left(\frac{1}{2}\right)\left(\Gamma\left(\frac{1}{2}\right)\Gamma\left(\frac{5}{2}\right)-\Gamma^2\left(\frac{3}{2}\right)\right)}} = \mp\sqrt{\sqrt{\pi}\,\sigma}$$

The coefficients of the polynomials used in the generation of orthogonal UWB unitary pulses can thus be determined.

For m>2, there are m+1 equations to be written. A first equation expresses the fact that the scalar product of the function $I_m$ by itself is equal to one: $S_{m,m}=1$ and m equations express the orthogonality of the function $I_m$ with the set of functions $\{I_k\}_{0 \le k < m}$: $S_{k,m}=0$.

Figure 6:
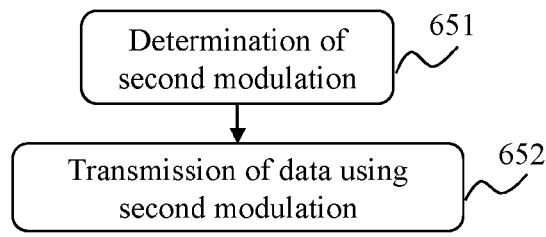
FIG. 6 illustrates schematically an example of implementation of the invention in which the positioning module implements a communication function using an UWB modulation allowing to obtain UWB pulses orthogonal to the UWB pulses used for implementing a positioning function.

FIG. 6 illustrates schematically an example of implementation of the invention in which the positioning module implements a communication function using a UWB modulation allowing to obtain UWB pulses orthogonal to the UWB pulses used for implementing the positioning function.

During a step 651, the processing module, in order to implement the communication function, obtains a UWB modulation allowing to obtain composite UWB pulses orthogonal to the composite UWB pulses used for implementing the positioning function.

In one embodiment, the positioning function of the positioning module 103 uses, for example, a modulation generating unitary UWB pulses $\alpha(t)$. In this case, the processing module 104 can choose a modulation generating unitary UWB pulses $\beta(t)$ or $\gamma(t)$ in order to implement the communication function of the positioning module 103.

In one embodiment, each function of the positioning module 103 uses a composite pulse resulting from a concatenation of at least two unitary pulses orthogonal in pairs taken from the unitary pulses $\alpha(t)$, $\beta(t)$ and $\gamma(t)$. In this embodiment, at least one unitary pulse of a composite pulse obtained by the modulation used for the positioning function is orthogonal to each unitary pulse of a composite pulse obtained by the modulation used for the communication function. For example, the positioning function uses a modulation allowing to obtain composite pulses resulting from a concatenation of the unitary UWB pulses $\alpha(t)$ and $\beta(t)$. In this case, the implementation of the communication function can use a modulation allowing to obtain composite pulses resulting from a concatenation of the unitary UWB pulses $\alpha(t)$ and $\gamma(t)$ or $\gamma(t)$ and $\beta(t)$.

In a step 652, the data to be transmitted are transmitted by the positioning module 103 using the UWB modulation allowing to obtain the composite UWB pulses orthogonal to the composite pulses used for implementing the positioning function.

The embodiments using antennas having orthogonal polarities and modulations allowing to generate orthogonal composite UWB pulses can be combined. In this case, the communication function can use an antenna having a first polarity to transmit first composite UWB pulses, and the positioning function can use an antenna having a second polarity, orthogonal to the first polarity, to transmit second composite UWB pulses orthogonal to the first composite UWB pulses.

The invention claimed is:

1. A method for communication in an ad hoc network, the ad hoc network comprising a coordinating mobile communication device, referred to as the coordinated device, and a plurality of subordinate mobile communication devices, referred to as subordinate devices, each communication device comprising a wireless communication module and a positioning module using a transmission of first pulses modulated in accordance with a first ultra-wide band modulation in order to determine information representing a position of said communication device, wherein the method comprises when it is implemented by a communication device:
   obtaining data to be transmitted;
   checking a transmission capability of the wireless communication module; and
   when the wireless communication module does not allow to transmit the data, using the positioning module to transmit said data in the form of second pulses orthogonal to the first pulses.

2. The method according to claim 1, wherein the positioning module uses a first antenna having a first polarity to transmit the first pulses and a second antenna having a polarity orthogonal to the first polarity to transmit the second pulses.

3. The method according to claim 1, wherein the step of using the positioning module for transmitting said data in the form of second pulses orthogonal to the first pulses comprises a step of obtaining a second ultra-wide band modulation allowing to obtain second pulses orthogonal to the first pulses, said data being transmitted using the second modulation.

4. The method according to claim 3, wherein the first and second modulations are pulse position modulations allowing to obtain pulses, referred to as composite pulses, comprising at least one unitary pulse, each unitary pulse being represented by the following formula:

$$I_n(t) = P_n(t)\,G(t)$$

where n is an index taking a different integer value for the first or second modulation, $P_n(t)$ is an $n^{th}$ degree polynomial such that $P_n(t)=\Sigma_{k=0}^{k=n}a_{k,n}t^k$, where $a_{k,n}$ is a coefficient of the $n^{th}$ degree polynomial, k an integer number and t a variable representing time, G (t) is a Gaussian function such that $$G(t) = \frac{1}{\sqrt{2\pi}\,\sigma} e^{-\frac{t^2}{2\sigma^2}};$$

the unitary pulses included in a composite pulse being orthogonal in pairs and at least one unitary pulse of a composite pulse obtained by the first modulation being orthogonal to each unitary pulse of a composite pulse obtained by the second modulation.

5. The method according to claim 4, wherein the coefficients $a_{k,n}$ of the polynomials are obtained iteratively by determining first the coefficient of the polynomial with the lowest degree, and then determining successively the coefficients of the higher-degree polynomials.

6. A computer program product embodied in a non-transitory computer readable medium comprising instructions for the implementation, by a device, of the method according to claim 1 when said computer program product is executed by a processor of said device.

7. A non-transitory computer storage means, storing a computer program comprising instructions for the implementation, by a device, of the method according to claim 1, when said program is executed by a processor of said device.

8. A mobile communication device included in an ad hoc network, said mobile communication device comprising a wireless communication module for communicating data with other mobile communication devices in the ad hoc network and a positioning module using a transmission of first pulses modulated in accordance with a first ultra-wide band modulation for determining information representing a position of said communication device, wherein said device comprises circuitry adapted for:
- obtaining data to be transmitted;
- checking a transmission capability of the wireless communication module;
- transmitting said data in the form of second pulses orthogonal to the first pulses using the positioning module when the wireless communication module does not allow to transmit the data.

9. A communication system comprising a plurality of mobile communication devices according to claim 8.

* * * * *